US006687005B2

(12) United States Patent
Kim

(10) Patent No.: US 6,687,005 B2
(45) Date of Patent: Feb. 3, 2004

(54) COMBUSTIBLE GAS DETECTOR AND METHOD FOR OPERATING SAME

(75) Inventor: Kyu-Jung Kim, Seoul (KR)

(73) Assignee: Korea Industrial Safety Corp. (KR)

( * ) Notice: Subject to any disclaimer, the term of this patent is extended or adjusted under 35 U.S.C. 154(b) by 419 days.

(21) Appl. No.: 09/736,012

(22) Filed: Dec. 13, 2000

(65) Prior Publication Data

US 2002/0126017 A1 Sep. 12, 2002

(30) Foreign Application Priority Data

Mar. 6, 2000 (KR) .................................. 10-2000-10976

(51) Int. Cl.[7] ................................................ G01N 31/12
(52) U.S. Cl. ......................................... 356/437; 422/94
(58) Field of Search ............................ 422/94; 356/437

(56) References Cited

U.S. PATENT DOCUMENTS 4,541,988 A * 9/1985 Tozier et al. ................. 422/94

* cited by examiner

*Primary Examiner*—Richard A. Rosenberger
(74) *Attorney, Agent, or Firm*—Dilworth & Barrese, LLP

(57) ABSTRACT

A method and apparatus for protecting workers from casualty due to a combustible gas. A portable combustible gas detector is disclosed which is particularly suitable for portable use. The detector generally comprises a circuit, housed in the same chamber as the sensor, for controlling the operation of the gas detector; and operation software for operating the detector through the circuit. The circuit of the detector is encased in armor to protect the circuit from electromagnetic wave disturbance.

The detector is particularly suitable for measurement of a combustible gas with a low concentration. Advantageously, the present invention enables a worker to conveniently carry a small and lightweight combustible gas detector into a hazardous worksite to improve the safety of each worker carrying the device.

26 Claims, 3 Drawing Sheets

COMBUSTIBLE GAS DETECTOR AND METHOD FOR OPERATING SAME

BACKGROUND OF THE INVENTION

1. Field of the Invention

The present invention relates to combustible gas detectors, and more particularly to a miniature combustible gas detector operable within a limited space.

2. Description of the Related Art

The risk of an explosion due to a combustible gas at an industrial work site has always existed. Conventional gas detectors offer one possible preventive measure in the hopes of curtailing this risk. Conventional gas detectors, however, are impractical for a few reasons; first, they are too large for workers to carry to such sites, and secondly, their production costs are prohibitive for mass production. That is, portability and economy were never considerations in their design.

A need therefore exists for a combustible gas detector, which is miniaturized, lightweight and affordable. The miniaturization, however, should not mitigate the performance of the detector.

SUMMARY OF THE INVENTION

In accordance with the present invention, a miniaturized combustible gas detector is provided in which both the sensor and the processing circuitry are configured in a common housing, the detector comprising: a control circuit for controlling the operation of the gas detector, operational software for operating the detector via the control circuit; an armor case providing electromagnetic protection for the control circuit; a clip installed at one side of the armor case for clipping the detector on a worker's uniform, a power switch for operating the detector; power supply means for supplying a direct current power for operating the control circuit; and an LED display for displaying the operational status of the detector.

The control circuit further includes a sensor for sensing a combustible gas when the power switch is turned on; a sensor driving circuit for driving said sensor, a signal conditioner for amplifying and converting the signals sensed by said sensor; an A/D converter for converting analog signals received from the signal conditioner into digital signals, a CPU for processing the digital signals under control of said operational software; an EEPROM for storing the data processed by said CPU and for storing said operational software; and an alarm for providing an alarm indication depending on the result processed by said CPU.

A method for operating the combustible gas detector according to the present invention generally comprises the steps of: driving the combustible gas detector; initializing the combustible gas detector; conducting a self-diagnostic of the combustible gas detector upon completion of the initialization step; activating a measurement mode upon completion of the conducting step; confirming whether a key-in is activated after said measurement mode has been activated; activating a sub-menu in the event said key-in is activated; otherwise activating a power saving mode in the event said key-in is not activated.

The detector of the present invention is advantageously designed so that it may be conveniently carried and worn with ease.

According to one aspect of the invention, the detector is constructed such that once a user turns on the detector it cannot be turned off for safety reasons. That is, the detector is continuously operable for 24 hours under battery power, preferably of an alkaline variety.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where.

DETAILED DESCRIPTION OF THE PREFERRED EMBODIMENTS

Figure 1:
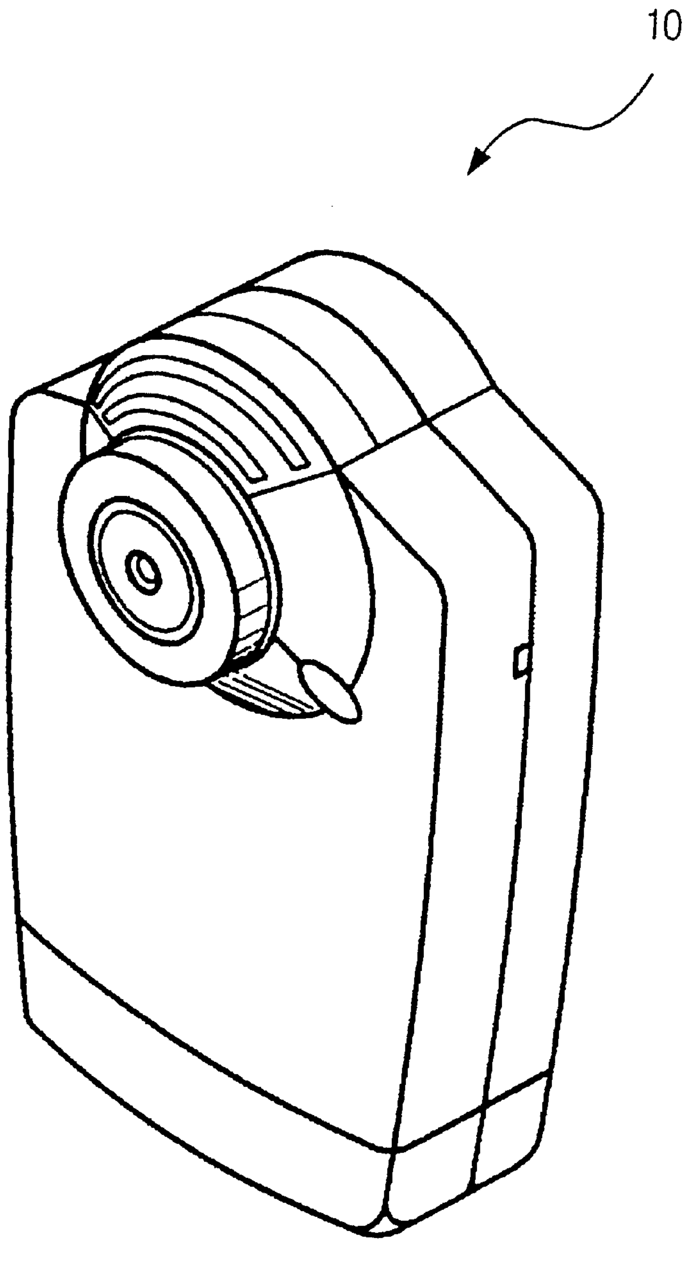
FIG. 1 is a perspective view of the combustible gas detector according to the present invention.
Figure 2:
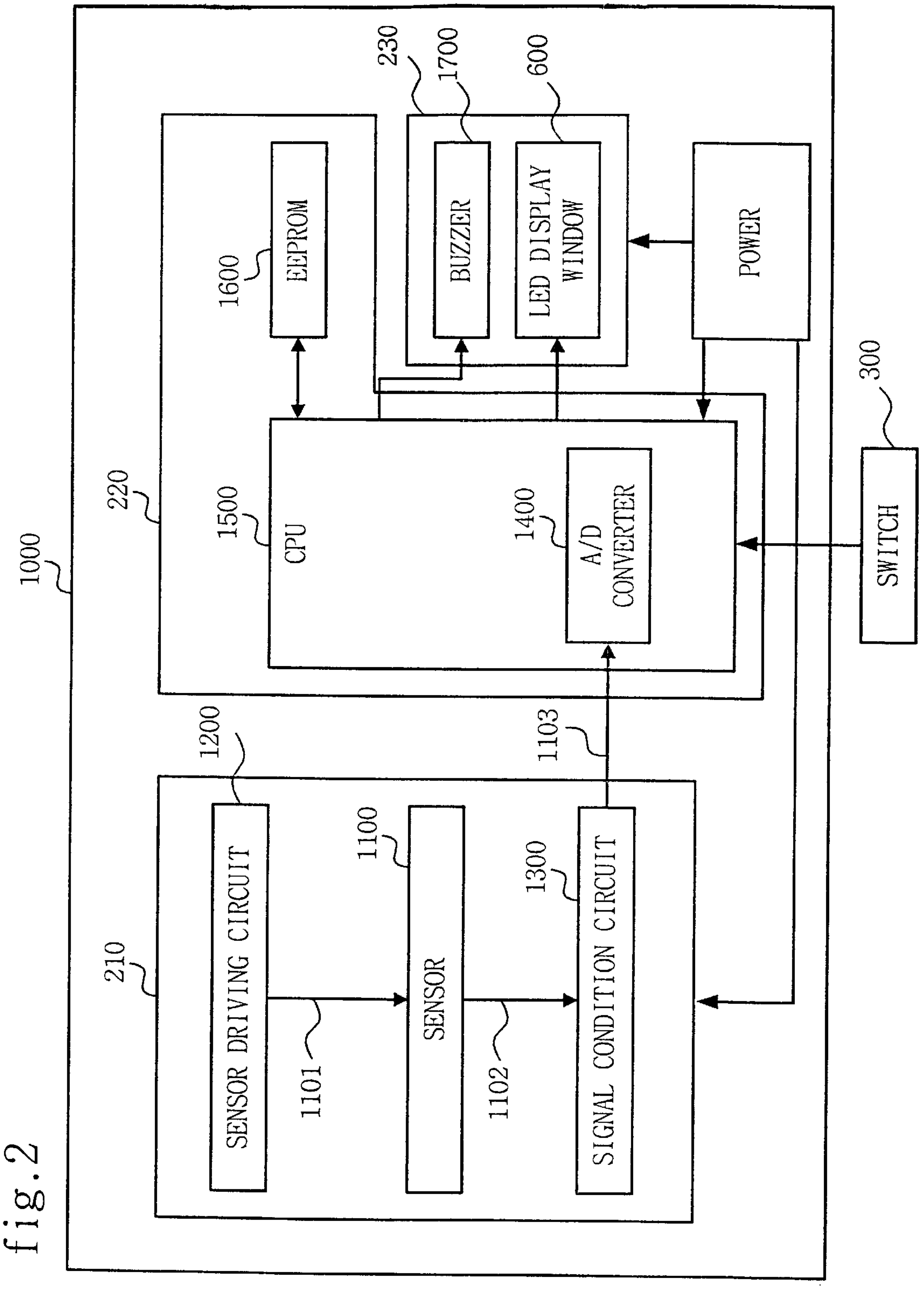
FIG. 2 is a block diagram of a control circuit in the combustible gas detector according to the present invention.

Illustrated in FIGS. 1 and 2 is an embodiment of the combustible gas detection and measurement apparatus of the present invention.

FIG. 1 is a perspective view of the combustible gas detection and measurement apparatus of the present invention, generally indicated as reference numeral 10 and hereinafter referred to as detector 10. Detector 10 meets the Ex ib IIC T4 class, as defined in the IEC79-11 intrinsic safety class, and further is resistant against electromagnetic disturbances. The detector 10 includes the following additional features: an inhibition resistance in consideration of the inhibition which occurs when any particular compound combines with the reaction surface of the catalyst inhibiting the combination of the combustible gas. The detector 10 is preferably constructed with fully certified flameproof components. Further, the detector 10 is constructed such that once a user turns on the detector 10 for safety it cannot be turned off, as it is continuously operable for 24 hours under battery power, preferably of an alkaline variety.

FIG. 2 is a block diagram of a circuit 1000 of the detector 10 comprising a sensor driving circuit 1200, a sensor 1100, a signal conditioner 1300, an A/D converter 1400, a CPU 1500, an EEPROM 1600 and a buzzer 1700. Circuit 1000 advantageously eliminates voltage drops, which may otherwise occur in prior art constructions, between the sensor 1100 and sensor detection circuitry. Such voltage drops are eliminated by virtue of the integrated construction of control circuit 1000. Control circuit 1000 also compensates for fluctuations in the power voltage caused by the CPU 1500. Sensor 1100, sensor driving circuit 1200 and signal conditioning circuit 1300 comprise sensor/signal processing section 210. Sensor/signal processing section 210 converts an output of the sensor 1100 into a data format that can be processed by the CPU. Sensor driving circuit 1200 maintains the operational condition of the sensor 1100 and converts a sensor output signal 1101 into a voltage signal 1102. The sensor driving circuit 1200 is designed to minimize power consumption. Minimum power consumption is achieved in three ways. First, a source voltage is applied directly to the sensor 1100 thereby eliminating voltage drops. Second, source voltage fluctuations are compensated for by the CPU 1500. Third, the buzzer 1700 is designed as a low power consumptive module. Further, the adoption of the surface mount device (SMD) enables the sensor/signal processing section 210 to be miniaturized and lightweight.

Sensor 1100 is preferably of a catalytic oxidization type. While thermal conductive type sensors, catalytic oxidation type sensors, and non-dispersive infrared ultraviolet rays NDIR type sensors are used in prior art applications to measure combustible gas, a catalytic oxidation type sensor is preferably used in the present invention because it is the most widely used sensor type for industrial safety applications and is also suitable for measurement of the combustible gas up to a low concentration 100% lower explosive limit (LEL).

Sensor 1100 has shock resistance to prevent the platinum wire used from being broken by any mechanical impact and further to prevent a permanent drift from being generated due to any change in the hot wire length.

The sensor 1100 of the present invention also includes poison resistance. Poison resistance is utilized to prevent the harmful effects which occur when the catalytic oxidation sensor combines with an external catalyst thereby diminishing the activation level of the sensor. Poisonous external catalysts include atmospheric silicon and hydrogen sulfide.

Circuit 1000 further comprises operational software section 220 which preferably includes a self-calibration function (not shown) and a self-diagnostic function (not shown). Section 220 comprises a central processor unit (CPU) 1500 for processing analog signals 1103 received from the sensor/signal processing section 210, an A/D converter 1400 for converting the analog signals received from the sensor/signal processing section 210, and an EEPROM 1600 for storing data processed by the CPU 1500. Operational software section 220 includes two safeguards against incorrect keypad operations initiated by an operator. The safeguards include a zero calibration prevention safeguard and a span calibration prevention safeguard. These safeguards prevent the unintended initiation of either zero calibration or span calibration from being performed by requiring that an operator depress a calibration mode entry key for at least 7 seconds (i.e., perform a key-in operation).

Section 220 also extends the usable life of the apparatus of the present invention by utilizing a power saving mode. In particular, the CPU 1500 operates in two modes, a normal operation mode in which the CPU 1500 actively measures gas densities and generates alarms when required. In the normal operation mode energy use (i.e., battery power) is maximized. In the normal operation mode, the CPU 1500 can measure gas densities rapidly (e.g., on the order of microseconds). Such rapid measurement rates are achievable because the density of the external atmosphere varies much more slowly in comparison to the CPU 1500 measurement rate. When the CPU 1500 is not operating in the normal operation mode it transitions to a sleep mode where the current consumption is maintained at 20 microamperes. The CPU 1500 operates alternately in the normal and sleep modes in accordance with a pre-determined time rate thereby allowing the gas density to be measured with minimum current consumption.

Control circuit 1000 further comprises an alarm section 230 configured to provide the following alarms. A main alarm is sounded in response to the detection of an instantaneous concentration level of any combustible gas and/or vapor, where the concentration level exceeds 25% LEL. Different LEL levels may be established in alternate embodiments. In the present invention a device malfunction alarm is sounded in three cases: (1) a low voltage condition in the detector 10, (2) where a malfunction is detected in either the sensor 1100 and/or circuit 1300, and (3) where a malfunction is detected in circuit 1000 for other than a sensor abnormality. Section 230 further comprises a buzzer 1700 and an LED display window 600 which is operable in concert with the buzzer 1700 for displaying detection events.

Circuit 1000 further includes an intrinsic safety/electromagnetic wave-proof housing (not shown) which is coated with an aluminum vacuum layered coating over the housing exterior. The coating prevents electromagnetic waves from propagating through the device.

The sensing range of the sensor 1100 is 100% LEL CH4. Major functions of the detector 10 include a self-diagnostic function, an operation confirmative function (i.e., confidence bleep), a zero calibration function which utilizes clean air, and is initiated by a one touch-type operation, and a span calibration function using a standard gas, preferably 20% LEL (methane), also initiated by a one touch-type operation.

1. Startup Operation

The startup operation of the detector 10 according to the present invention is described as follows. Referring to FIG. 1, upon turning on the power switch 300, a green LED lamp is turned on in the LED display window 600 in parallel with a alarm 1700 sounding 5 times, thereby informing a user that the detector 10 was turned on. Then, the detector 10 conducts a self-diagnostic procedure to check for malfunctions. If there are no detected malfunctions, the detector 10 stabilizes and then goes through a warm up stage lasting approximately 1 minute. As the detector 10 is warming up, the green LED lamp is turned on every 3 seconds to inform the operator of the warm up state. When warm up is normally completed, the green LED lamp flickers in the LED display window 600 in parallel with a alarm 1700 sounding two times. Otherwise, if there is any detected malfunction during warmup, a red LED lamp flickers in the LED display window 600 in parallel with the alarm 1700 sounding one time.

2. Preferred Method of Operation

Figure 3:
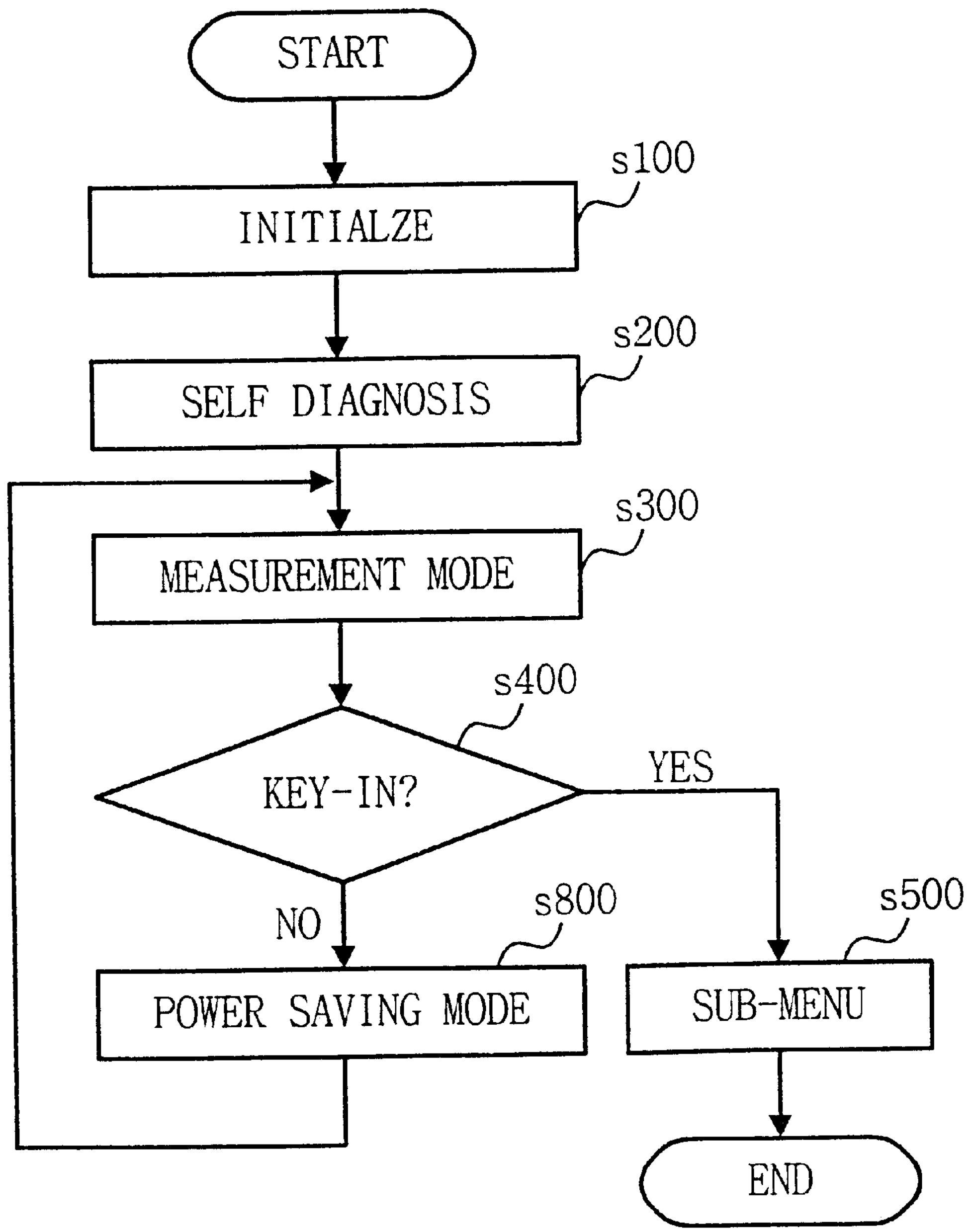
FIG. 3 is a flowchart of a method for operating the combustible gas detector according to the present invention.

FIG. 3 is a flowchart of a method for operating the combustible gas detector 10 according to the present invention subsequent to a successful startup operation.

At step 100, when the detector 10 is turned on, it is initialized. Specifically, an external interrupt and timer are initialized, and parametric values are read from the EEPROM 1600 including an alarm-setting value, a zero value and a span calibrating value.

At step 200, upon completing the initialization step, a self-diagnostic step is conducted where a number of data read/writes are performed to determine whether the EEPROM 1600 is operational. Data is read from and written to the EEPROM to perform this check. Also, the voltage of the battery and the detector 10 are checked. More particularly, at step 200, the battery voltage is checked to determine whether a low voltage condition has occurred and whether there is any malfunction in the sensor 1100 and the circuit 1000. It is noted that self-diagnostic step 200 is conducted by a one touch key operation (i.e., pressing a test switch for a predetermined time). That is, if the test switch is pressed for more than 1 second and less than 7 seconds self-diagnosis is conducted. During self-diagnosis the respective operational conditions of the sensor 1100, the battery (not shown) and the internal circuit 1000 are checked. If the detector 10 is operating under NORMAL conditions, a green LED lamp flickers in the LED display window 600 parallel with two separate audible alarms. If on the other hand, any malfunctions are detected, a red LED lamp flickers in the LED display window 600 in parallel with a single audible alarm. In sum, the self-diagnostic step is provided as a precautionary step to assure that the detector 10 is operating normally prior to a person carrying the detector 10 into a dangerous worksite.

At step 300, upon completion of self-diagnostic step 200, a measurement mode is activated to measure gas density for comparison with a threshold gas density value. In this step, the external stable voltage is activated, AD conversion is performed, the gas value is measured, the alarm is checked and then the time-out is checked.

At step 400, while in the measurement mode, it is determined whether a key-in operation is activated (i.e., whether an operator has pressed the power switch for more than one second and less than seven seconds) while the detector is turned on. In this event, a sub-menu is activated at step 500.

At step 500, when the sub-menu is activated in response to the key-in operation of step 400, automatic calibration functions including a zero calibration function and a span calibration function are performed.

Span calibration is required if the detector 10 is exposed to a poor air environment for an extended duration. When this occurs the respective zero points of the sensor 1100 and the electronic circuit may be slightly varied. Also, when a worker is exposed to a high concentration of a combustible gas or is exposed to a poor environment for an extended period, the respective span points of the sensor 1100 and the electronic circuit 1000 may be slightly varied.

Span calibration uses a standard calibration gas, such as 25+/−0.5% LEL, $CH_4$ (Methane) in air. To perform span calibration, the POWER button should be pressed for at least than 7 seconds in an ON state of the detector 10. Upon pressing the POWER button for at least 7 seconds, the detector 10 goes into SPAN ready state. In the SPAN ready state a self-diagnosis procedure is performed. If self-diagnosis procedure is completed successfully the LED 600 flashes green in parallel with the alarm 1700 sounding twice. Otherwise, the LED 600 flashes red and the alarm 1700 sounds once. Further, if self-diagnosis is not successful, the span calibration procedure is aborted and the calibration factors are maintained at their former values.

In the case where self-diagnosis is performed successfully, while the detector 10 is in span ready status, a standard calibration gas should be supplied. The detector informs the operator that Span calibration is being performed with the LED 600 flashing green every 3 seconds. Upon completion, if the span calibration procedure was successful, the LED 600 flashes green and the alarm 1700 sounds five times. Otherwise, if the span calibration procedure was unsuccessful, the LED 600 flashes red and the alarm 1700 sounds once.

Next, a zero calibration procedure is performed. Room air is used to perform the zero calibration. By pressing the test switch for at least 7 seconds under clean air conditions, a zero calibration cognitive alarm green LED lamp flickers and the alarm sounds twice after which a zero calibration procedure is carried out lasting approximately 30 seconds. Here, the green LED lamp flickers approximately every 3 seconds, which indicates that the detector 10 is performing the zero calibration. If the zero calibration is successful, the green LED lamp flickers in parallel with the alarm sounding twice. Otherwise, if there is any malfunction in the detector 10, or the influent air contains any combustible gas, a red LED lamp flickers along with a single audible alarm. In the event of a malfunction, a problem will be detected in the zero calibration process. Accordingly, the zero calibration procedure is automatically nullified and the previously performed zero calibration is maintained intact. That is, calibration factors are preserved as former values obtained in a most recent calibration.

In the case where the zero calibration procedure is performed without incident (e.g., a clean air condition) the accuracy of an alarm state is improved. The zero calibration procedure is preferably performed at least once per week in a gas free and clean atmosphere.

If the key-in operation is not performed at step 400, the power saving mode is activated at step 800. In this step, a watchdog timer is reset, and the detector 10 transitions from the measurement mode to the sleep mode. The watchdog timer controls the state of the CPU to alternately change between the sleep mode (i.e., current saving mode) and the measurement mode.

In sum, the present invention advantageously enables a worker to conveniently carry a small and lightweight combustible gas detector 10 on his/her person to enhance the worker's safety. Further, the portable gas detector 10 according to the present invention is more affordable to manufacture than the conventional detector 10 so that it can be widely distributed among work sites and consequently contribute toward worker safety.

In addition, since the detector 10 according to the present invention includes a self-diagnostic function, the reliability of the detector 10 is enhanced. Further, the detector 10 includes a power saving mode, which allows its usable lifespan to be appreciably extended. A further advantage of the detector 10 of the present invention is that it eliminates electromagnetic wave disturbances. In addition, the detector 10 of the present disclosure is particularly suitable for measurement of a combustible gas having a low concentration.

While the invention is susceptible to various modifications and alternative forms, specific embodiments thereof have been shown by way of example in the drawings and have been described in detail. It should be understood, however, that it is not intended to limit the invention to the particular forms disclosed, but on the contrary, the intention is to cover all modifications, equivalents and alternatives falling within the spirit and scope of the invention as set forth in the claims below.

What is claimed is:

1. A portable combustible gas detector apparatus for detecting a combustible gas, comprising:

- a housing defining an inner chamber between a first end and a second end, said second end having an access opening to said chamber;
- a sensor device disposed within said chamber in communication with said access opening and being operable for sensing and measuring gas levels, and for providing sensor signals in response to said sensed gas levels;
- a circuit disposed within said chamber and being operable for processing input signals associated with sensed gas levels and generating output signals, said circuit comprising:
  - a sensor driving circuit operationally coupled to said sensor, said sensor driving circuit for maintaining said sensor device in an operational state, and for converting said sensor signals into analog voltage sensor signals;
  - a signal conditioning circuit operationally coupled to said sensor driving circuit, said signal conditioning circuit for amplifying and converting said analog voltage sensor signals;
  - an analog to digital (A/D) converter for converting said analog sensor signals into digital sensor signals;
  - a central processing unit (CPU) for processing the digital sensor signals into data having a data format that can be processed by a central processor unit (CPU);
  - calibration means for establishing a sensor zero point, said calibration means requiring manual actuation of a power switch for a predetermined minimum period of time;

operational software for controlling a plurality of operations of the portable gas detector through said circuit; and power supply means for supplying a direct current to said circuit.

2. The apparatus of claim 1, further comprising a vacuum-metalized aluminum case to shield radioactive and conductive electromagnetic waves.

3. The apparatus of claim 1, further comprising mounting means for attaching the portable gas detector to a person.

4. The apparatus of claim 3, wherein said mounting means is a clip installed on one side of said portable gas detector.

5. The apparatus of claim 1, further comprising an LED display operably coupled to an output port of said CPU, said LED display for displaying an indication of a current operating state of the portable gas detector.

6. The apparatus of claim 1, further comprising an electrically erasable programmable memory (EEPROM) for storing said data processed by said CPU, and for storing said operational software.

7. The apparatus of claim 1, further comprising an alarm including a plurality of alarm classes, wherein each of said plurality of alarm classes is associated with an operational state of said portable gas detector.

8. The apparatus of claim 7, wherein said plurality of audible alarm classes comprises:

a main alarm class activated in the event a concentration of said combustible gas exceeds a predetermined value; and a device malfunction alarm class activated in the event one of a low voltage is detected in said portable gas detector, and a malfunction occurs in the sensor, and a malfunction occurs in the circuit.

9. The portable combustible gas detector of claim 1, further comprising self-diagnostic means for diagnosing any low voltage and any malfunction of the sensor and/or circuit.

10. The apparatus of claim 1, wherein room air is used to calibrate a zero point.

11. The apparatus of claim 10, wherein a standard gas is used to calibrate a span by a one touch operation.

12. The apparatus of claim 1, wherein said sensor device is of a catalytic oxidation type.

13. The apparatus of claim 1 wherein said calibration means includes first indicator means for providing visual indication of the success or failure of the calibration, and second indicator means for providing audible indication of the success or failure of the calibration.

14. A method for operating a combustible gas detector, the method comprising:

driving the combustible gas detector;

initializing the combustible gas detector;

performing a self-diagnostic procedure;

activating a measurement mode;

determining whether a key-in is activated;

activating a sub-menu in the event said key-in is activated; and otherwise activating a power saving mode in the event said key-in is not activated.

15. The method according to claim 14, wherein said initialization step further comprising the steps of:

initializing an external interrupt and a timer; and reading parametric values.

16. The method according to claim 15, wherein the parametric values comprise a zero value, a span value, and a preset alarm value.

17. The method according to claim 14, wherein the step of performing a self-diagnostic procedure further comprises the steps of:

depressing a test switch for a prescribed time to enter a self-diagnostic mode; and checking operational conditions of a sensor, a battery and an internal circuit while in said self-diagnostic mode.

18. The method according to claim 17, wherein at said checking step if it is determined that said detector is determined to be in a normal condition, a green LED lamp is activated to an ON state and an audible alarm is sounded twice.

19. The method according to claim 17, wherein at said checking step if it is determined that said detector is determined to be in a malfunction condition, a red LED lamp is activated to an ON state and an audible alarm is sounded once.

20. The method according to claim 14, wherein the step of checking the operational conditions of said internal circuit includes the step of checking a set condition of an EEPROM.

21. The method according to claim 14, wherein the step of activating a measurement mode further comprises the steps of:

activating an external stable voltage;

performing an A/D conversion;

calculating a gas value; and checking the alarm.

22. The method according to claim 14, wherein said sub-menu activation step further comprises simultaneously performing a zero point calibration and a span calibration.

23. The method according to claim 14, wherein the step of activating a power saving mode further comprises:

resetting a watch dog timer;

operating the detector in a sleep mode for a prescribed time defined by said watch dog timer; and operating the detector in said measurement mode upon expiration of said prescribed time defined by said watch dog timer.

24. The apparatus of claim 14 wherein the key-in is activated by actuation of a power switch for a period of time ranging from at least one second to no more than about 7 seconds.

25. A portable combustible gas detector for protecting workers from casualty originating from inadvertent exposure to a combustible gas, the detector comprising:

a sensor device;

a control circuit for controlling a plurality of operational states of the gas detector, said control circuit further comprising:

a sensor driving circuit operationally coupled to said sensor device, said sensor driving circuit for maintaining said sensor device in an operational state, and for converting said sensor signals into analog voltage sensor signals;

a signal conditioning circuit operationally coupled to said sensor driving circuit, said signal conditioning circuit for amplifying and converting said analog voltage sensor signals;

an analog to digital (A/D) converter for converting said analog sensor signals into digital sensor signals;

a central processing unit (CPU) for processing the digital sensor signals into data having a data format that can be processed by a central processor unit (CPU);

- an electrically erasable programmable memory (EEPROM) for storing data processed by said CPU and for storing operation software, said operation software for operating the gas detector via said control circuit
- an armor case for protecting said control circuit from electromagnetic wave disturbance;
- a clip installed on one side of said armor case for attaching said detector to a worker's uniform;
- a power switch for delivering/removing power from the gas detector;
- a battery for supplying a direct current power for operating said control circuit;
- an LED display for displaying operational states of the gas detector;
- an audible alarm including a plurality of alarm classes, wherein each of said plurality of alarm classes is indicative of whether the operational state of said gas detector is in a normal operational condition or in a malfunction condition; and
- self-diagnostic means for diagnosing any low voltage and any malfunction of the sensor device and/or circuit.

26. A method for operating a combustible gas detector comprising the steps of:

- turning on the gas detector;
- initializing an external interrupt and a timer of the gas detector; and
- reading one or more parametric values;
- conducting a self-diagnostic procedure of the gas detector upon completion of the initialization step, said self-diagnostic procedure including the steps of:
  - depressing a test switch for a prescribed time;
  - checking operational conditions of a sensor, a battery and an internal circuit to determine if said gas detector is in one of a normal or malfunction condition;
  - activating a green LED lamp to an ON state and sounding an audible alarm twice in the event said gas detector is determined to be in a normal condition at said checking step; and
  - activating a red LED lamp to an ON state and sounding an audible alarm once in the event said gas detector is determined to be in a malfunction condition at said checking step;
- activating a measurement mode upon completion of the conducting step, comprising the steps of:
  - activating an external stable voltage;
  - performing an A/D conversion;
  - calibrating a gas value;
  - calculating a gas value;
  - checking the alarm; and
  - checking a time-out;
- determining whether a key-in is activated after said measurement mode has been activated;
- activating a sub-menu in the event said key-in is activated, comprising the steps of:
  - performing a zero point calibration and a span calibration simultaneously; and
  - conducting a function to prevent a wrong operation;
- otherwise activating a power saving mode in the event said key-in is not activated.

* * * * *